INGLE L. McADA
INVENTOR.

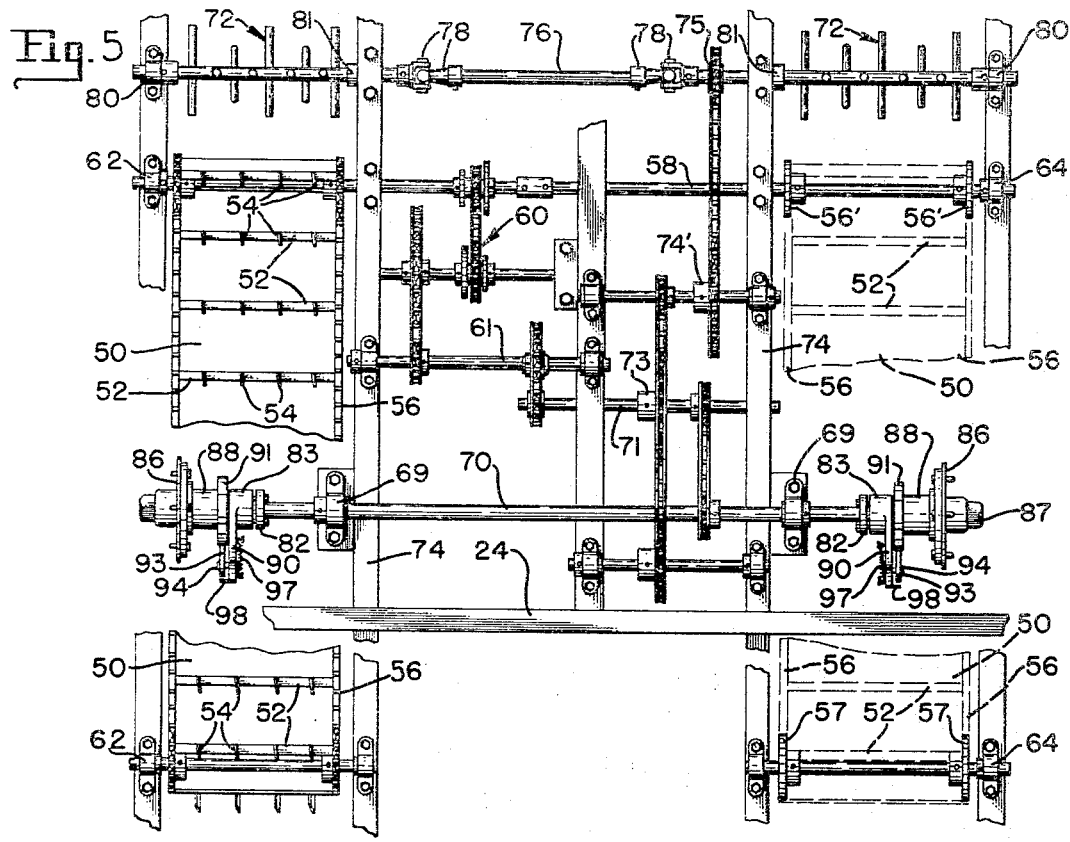
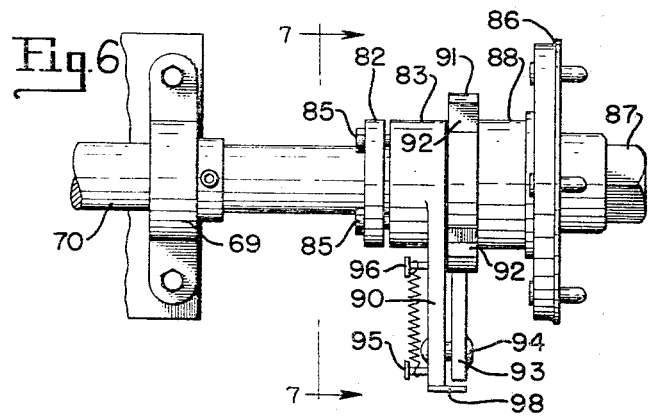
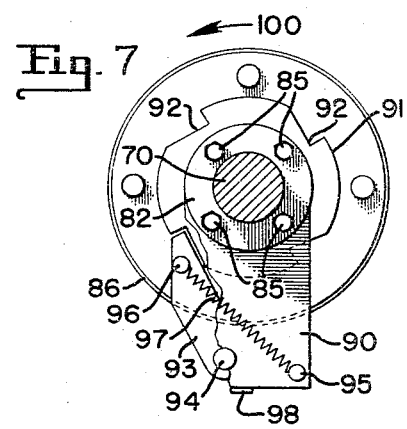
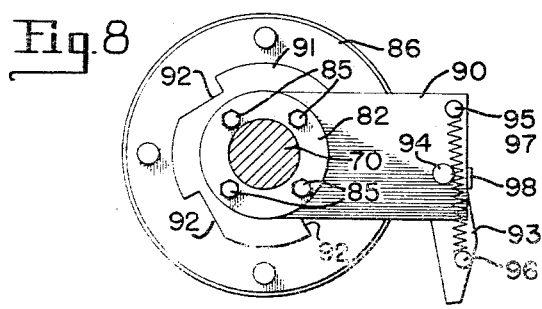
INGLE L. McADA
*INVENTOR.*

United States Patent Office 3,330,234
Patented July 11, 1967

3,330,234
GRASS SPRIG PLANTER
Ingle L. McAda, Wichita Falls, Tex.
Filed Apr. 11, 1966, Ser. No. 541,722
9 Claims. (Cl. 111—2)

This invention relates to an agriculture implement generally known as a grass sprig planter and more particularly to two row planters, although the device readily lends itself, in its present form, to three and four row planters. More specifically the invention concerns a direct connected grass sprig planter having a spring loaded plow therefor, to avoid injury to the mechanism and to the operator thereof upon the plow striking immovable objects. The invention further comprehends a novel clutch mechanism associated with each drive wheel thereon that overcomes many of the defects of similar prior art devices. The implement with which this invention is concerned is particularly adapted for attachment to a tractor equipped with a draw bar by which the implement may be quickly connected thereto and be carried thereby during use and in transport.

Grass sprig planters, of the instant type, are generally employed in planting grass sprigs under conditions of unfavorable or rough terrain such as may be experienced in water flood control and the like. Under such conditions, oftentimes the grass is planted after commercial removal of trees or after considerable removal of soil from a large area. A bottom plow, or the like, is subjected to damage in traveling such terrain by encountering obstructions, including stumps, stones, uneven ground level, and unusually hard soil conditions. A planter of the instant type generally employs a rigidly affixed plow arranged at the forward portion of the implement, and accordingly, when the plow encounters such obstacles as described above, it is generally damaged or else suddenly decelerated under extreme conditions that may cause the rear of the machine to be tossed into the air, thereby often resulting in damage to the machinery.

Another problem that this novel invention overcomes, which is prevalent in the prior art of grass sprig planters, relates to the drive mechanism which moves the grass sprigs through a trough by a conveyor system, while at the same time, powers the sprig separator and discharge unit. In the prior art, implements are powered by a drive mechanism attached at each wheel of the grass sprig planter, which accordingly separately powers the before mentioned conveyor system and the grass separating and discharge units respectively. In such an arrangement, when the sprig planter is turned to the left in order to reverse its direction of travel, the power drive mechanism, associated with the right wheel, speeds up the rotation of the conveyor while the sprig separating and discharging unit is accordingly slowed down due to the difference in rotational velocity of each wheel. On the other hand, when executing a turn to the right to reverse the direction of travel of the implement, the speed of the conveyor unit will slow up while the sprig separating and discharge device is accelerated and accordingly this action tends to clog or overload the unit with the grass sprigs. This latter arrangement along with the prior art plow has been a major drawback in the sprig planting implement field.

It is accordingly an object of the present invention to provide a sprig planter implement with a novel spring loaded plow that is capable of use under a wide variety of soil and terrain conditions.

It is a more specific object of this invention to provide an adjustable spring loaded plow that may be adjusted for optimum performance in various type soil conditions.

A further object of this invention is to provide a spring loaded plow that will automatically retract and then reset to proper plowing position to enable the plow to ride over rocks, stumps, and the like.

A further object of this invention is to provide a spring loaded plow mechanism which finds particular use in conjunction with a grass sprig planting implement that includes a contoured upper portion above the plow point that accordingly will enable the plow to be resiliently urged in an upward and backward direction upon encountering soil conditions that provide a barrier to the plow so as to avoid injury to the plow, implement, and personnel.

Another object of this invention is the provision of a combination plow, grass sprig conveying mechanism, and grass sprig separating and discharging device which jointly cooperate together in such a manner to produce a new article of manufacture that is adapted to traverse unfavorable terrain in a manner that has heretofore not been possible.

Another object of this invention is the provision of a grass planting implement having a clutch assembly associated with each of the two power wheels of the implement that is suitably connected to a power train to thereby drive the sprig conveyor and sprig separating and discharge device each at a predetermined and constant relative speed, dependent upon the rotational velocity of the fastest rotating wheel.

Another object of this invention is the provision of a clutch means for each wheel of a sprig planting implement that cooperates together in a manner to drive a shaft at a speed proportional to the fastest rotating wheel thereof.

Another object of this invention is the provision of a clutch mechanism for a sprig planting implement that may be selectively disengaged so as to improve the roadability of the implement.

Other objects and advantages reside in the detail construction of the invention, which is designed for simplicity, economy, and efficiency. These will become more apparent from the following description.

In the following detailed description of the invention, reference is had to the accompanying drawings which form a part thereof. Like numerals refer to like parts in all views of the drawings and throughout the description.

In the drawings:

FIGURE 5 is a partial bottom plan view of the mechanism of FIGURE 1 with some parts removed or broken away to show important features of the novel device;

FIGURE 6 is an enlarged side elevational view of the wheel hub and clutch mechanism taken from FIGURE 5;

FIGURE 7 is a sectional view taken along lines 7—7 of FIGURE 6, with some parts broken away and some additional parts shown to bring out essential details of the invention;

FIGURE 8 is the same view as FIGURE 7 with the operative relationship of some of the parts in a different position; and FIGURE 9 is a perspective view of a hitch tongue removed from a grass sprig planter.

Figure 1:
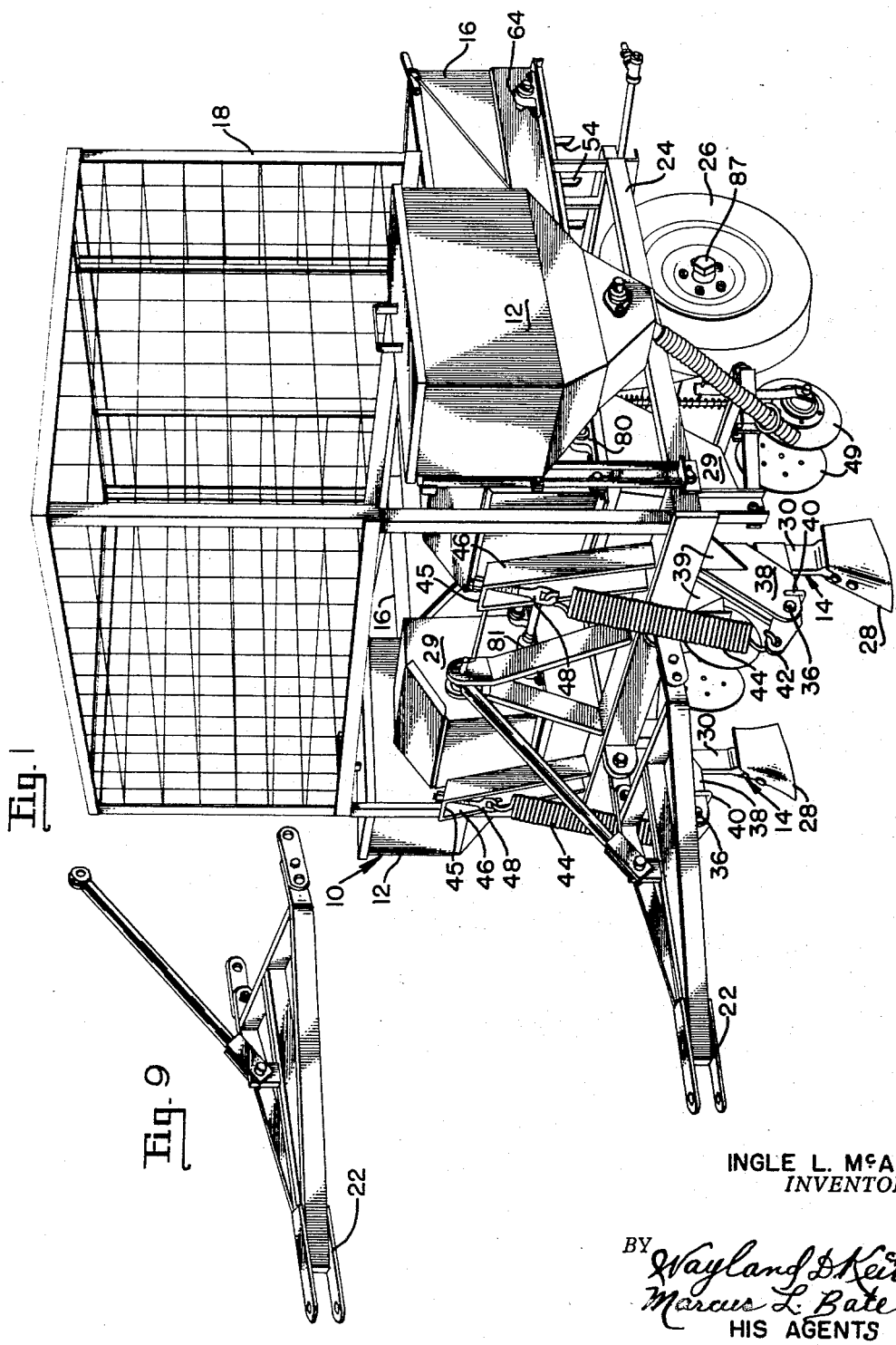
FIGURE 1 is a perspective view of the sprig planting machine made in accordance with this invention.

Referring now to the drawings in detail, FIGURE 1 illustrates more completely the entire planting machine which is generally designated by the reference numeral 10. The implement includes an optional fertilizer hopper 12 mounted on each side of the implement having a distributor and agitator suitably journaled therein as is known in the art. A plow 14 is suitably mounted at the forward portion on each side of the implement in front of the conveyor trough 16. A caged hopper 18 top mounted on the upper portion of the implement is adapted to receive a generous supply of the grass sprigs to be planted. The hopper is so designed as to supply the desired amount of grass to each conveyor trough during the planting. A hitch 22, by which the machine is pulled, projects forwardly from the front portion of the frame system 24. The implement is suitably mounted on a pair of wheels, one of which is indicated by the numeral 26.

Figure 2:
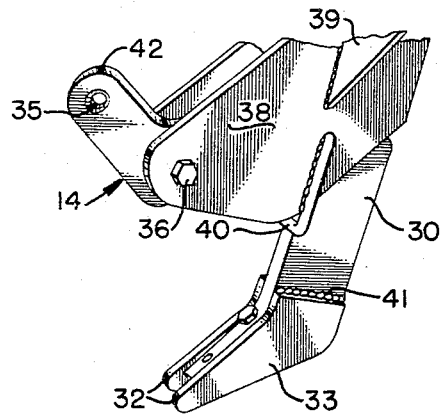
FIGURE 2 is a perspective view showing the plow shank mechanism of FIGURE 1, with some parts broken away and some parts removed for clarity.
Figure 3:
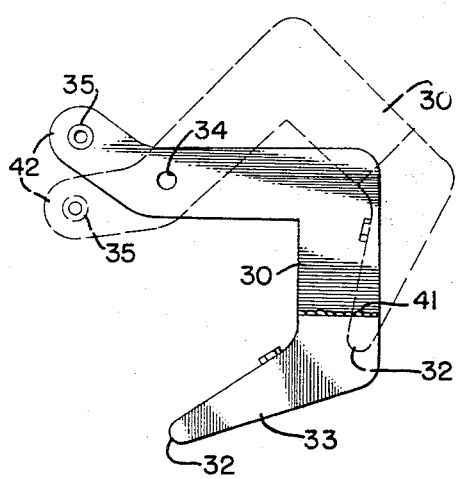
FIGURE 3 is a more or less schematic side view of the plow shank of FIGURE 2 with the retracted plow shank represented in phantom.
Figure 4:
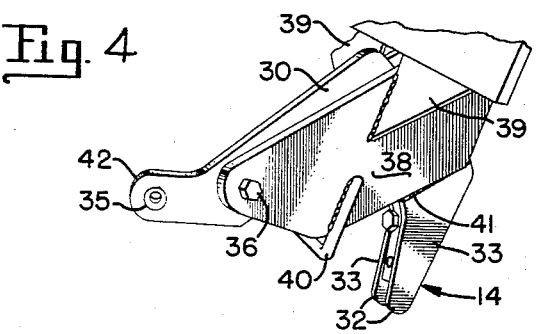
FIGURE 4 is a view similar to FIGURE 2 and showing the plow shank in retracted position.

Looking now to the details of FIGURES 2 through 4 in conjunction with FIGURE 1, there is disclosed therein a plow point or digging point 28 suitably affixed to a shank 30 having a bifurcated end portion 32 fabricated from spaced apart reinforcing members 33. The shank 30 is apertured at 34 and 35 with the aperture 34 receiving a pin 36 so as to provide a pivotal point about which the shank may rotate from the position illustrated in FIGURE 2 to that illustrated in FIGURE 4 and wherein the plow shank 30 may move between the two extremities indicated in FIGURE 3. A heavy built-up yoke 38 is attached to the framework 24 of the implement and is suitably reinforced by webs such as seen at 39. A stop member 40 comprised of a U-shaped rod suitably welded to each side of the yoke 38 limits the forward movement of the shank 30 with respect to the yoke 38. The shank 30 may be pivoted about pin 36 to the position shown in FIGURE 4 where the weld 41 of the bifurcated shank abuts the lower portion of yoke 38 to form a second stop means, as best seen in FIGURE 4 and schematically represented in FIGURE 3.

The depending upwardly curved end portion 42 of the shank 30 receives a spring 44 in the before mentioned aperture 35 that resiliently maintains the plow in the extended or lowered position of FIGURE 2. The spring 44 is mounted upon the frame 24 by means of an upstanding strut 46 having a tension adjusting means 48 adjustably received by a platform 45 having a bolt hole therethrough so as to provide for rapid adjustment of the spring tension associated with the shank of the plow.

Looking now to FIGURE 3 wherein the shank of the plow 30 is shown in two of its extreme pivotal positions, such as may be encountered when the plow of FIGURE 2 is rotated into the position of FIGURE 4. As seen in FIGURE 3, the lower extremity at the bifurcated end of the shank, as indicated by numeral 32, is more or less vertically aligned with the pivotal point at aperture 34 in order to provide upward and backward movement of the digging point 28 when the shank 30 moves against the tension of spring 44 and about the pivotal point at aperture 34. Any downward motion would cause the plow to dig further into the surface of the ground, hence the digging point must be located behind a plane vertically aligned with pivot pin 36. Stated differently, the shank 30 is positioned respective to the pivot pin 36 so that when moved from the fully extended position of FIGURE 2 towards the retracted position of FIGURE 4, the digging point moves up and back so as to avoid digging further into the ground.

Looking now to the details of FIGURE 5 wherein there is seen a plan view of a schematical representation of the drive mechanism associated with the wheels 26 of the grass sprig planter. As seen in FIGURE 5, a conveyor 50 comprised of horizontal spaced apart members 52 having upstanding finger like members 54 suitably connected thereto are fixed to spaced apart chain members 56 at the marginal edge of the conveyor 50. The chain members 56 are suitably engaged with sprockets 56', 57. The conveyor 50 is moved by the sprockets 56' that in turn are driven by the shaft 58 through the speed selector 60. The conveyor 50 is located in the conveyor trough 16 of FIGURE 1 and is suitably journaled by bearing members 62 and 64.

The speed selector 60 runs through a speed reducer, comprised of a series of chain driven sprockets driven from an axle 70 by means of shafts 61 and 71. The axle 70 is suitably journaled in pillow block bearings 69 attached to the framework 74 which is a portion of the framework 24. The axle 70 also drives the sprig separating and discharge units 72 through the illustrated stepped-up gear train of FIGURE 5 that includes sprockets 73, 74', and 75 that finally drive the shaft 76 that includes universal joints 78 therein so as to reduce the alignment problem of mating the two high speed grass separating and discharge units 72. The grass discharge units 72 are suitably journaled in the pillow block bearings 80, 81.

At each extremity of the axle 70 is provided a conventional spindle on which the wheel hub 88 is rotatably secured in low friction bearings, as is well understood in the art. The wheel hub 88 includes the conventional dust cover 87 and flange 86 to which the wheel 26 may be secured. A rack 91 centrally aligned and integrally attached, by welding or the like, to hub 88 is provided with sloped teeth formed by a cut-out at 92. The rack rotates with and is an integral part of the wheel hub 88. The axle 70 is provided with key-ways at each extremity thereof and further provided with a mating or similarly splined or milled sleeve 83 that is held rigidly affixed to the axle 70 by a back up plate 82 which presses the keys that engage the key-way of the axle and sleeve into tight engagement therewith upon tightening of the bolts 85. The sleeve 83 has an arm 90 depending therefrom. A pawl 93 is suitably apertured so as to be pinned at 94 to the before mentioned arm 90. The pawl 93 is provided with a pin 96 that carries a spring 97 attached to the before mentioned pin 95 on the arm 90. A stop 98 is suitably provided on the arm 90 to limit the rotation of the pawl from a position illustrated in FIGURE 7 to the disengaged position illustrated in FIGURE 8. As will now be evident from FIGURES 6, 7, and 8, the pins 95, 96, each located on the arm and pawl respectively, provide spaced apart attachment means between which is located the spring 97, held in tension therebetween so as to enable the pawl 93 to selectively engage the rack 91 in a first position and to engage the stop 98 in the second position as the spring urges the pawl 93 in an over-the-center action with respect to pivot pin 94, so that the pawl 93 is accordingly resiliently urged into either the engaged or disengaged position of FIGURES 7 and 8 respectively. Since the rack 91 is an integral part of the hub 88, which hub freely rotates in bearings located on a spindle at the extremity of shaft 70; and since the plate 82, sleeve 83, arm 90, and pawl are affixed to the shaft 70, it will now be evident that the shaft 70 will rotate with the wheel hub 88 when the pawl 93 engages the rack 91; and conversely, the shaft 70 will not rotate with the wheel hub 88 when the pawl 93 is in disengaged or retracted relation with respect to the rack 91 and as illustrated in FIGURE 8. In the last position, the wheel hub 88 will freely rotate in the wheel bearings without imparting any motion with respect to shaft 70.

*Operation*

In the operation, the device in FIGURE 1 will be attached to a tractor hitch or a suitable draw bar. The hitch 22 is removable to enable the grass sprig planter to be used with a conventional three point power lift. The plow assembly, generally indicated at 14 and including the digging point 28 that is removably attached thereto, will turn up the suitable amount of soil or form a furrow so as to accommodate the grass sprigs that are discharged from the unit 29. The furrow resulting from the action of the digging point 28 in the soil, after receiving the grass sprigs from the discharger unit 72, is covered with soil by the angularly arranged disks 49 which straddle the lower run of the conveyor 16 and in aligned relationship to the digging point. Upon encountering an obstruction such as extremely hard soil, rocks, tree stumps, or the like, the digging point 28 will overcome the tension of the spring 44 and the plow assembly 14 will rotate about pivot pin 36 from the position illustrated in FIGURE 2 to the retracted position of FIGURE 4 until the digging point has passed over the obstacle. It should be realized that the distance that the digging point 28 retracts against the tension of spring 44 is dependent upon the size of the obstruction causing the retraction of the plow assembly 14. Where the obstacle is small, the plow assembly may retract only a limited distance as required to permit the digging point 28 to ride over it; however, in the case of larger obstacles, the digging point 28 may be retracted to its extreme limit as illustrated in FIGURE 4. The forward portion of the digging point and the shank 30 cooperate to form a curved configuration at 31 so as to enable the plow to ride over large stumps and the like when the plow assembly has retracted to its fullest extent. The tension exerted by the spring 44 to hold the digging point 28 in extended position so that shank 30 is held against the stop member 40 may be regulated by the tension adjustment means 48 so as to provide an optimum spring tension for varied soil conditions.

In the operation of the device illustrated in the remaining FIGURES 5 through 8, it will now be seen that the shaft 70 is provided with a wheel hub having a clutch comprised of a pawl and ratchet arrangement at each extremity of the shaft. Since the shaft 70 provides the conveyor 50 and the grass sprig separating and discharge unit 72 with power from the sprocket driven shaft 71, the relative speed of the conveyor and discharge unit will remain constant with respect to each other and will be driven at a speed dependent upon the rotational velocity of the fastest moving wheel, assuming that the pawl is in engaged relationship with the ratchet on each of the wheels 26. Since each of these units are directly driven from shaft 70 according to the gear ratio between shafts 70 and 58 and shafts 70 and 76, the relative speed of the conveyor 50 and the grass sprig separating and discharge unit 72 will be at a speed in accordance with the rotational velocity of the wheel 26. That these two relative speeds are maintained proportional to the speed of the fastest rotating wheel should now be evident in view of FIGURES 6 through 8 which show the clutch arrangement located at the extremity of shaft 70 are engaged, or non-ratcheting, when the wheel 26 drives the rack 91 in a counterclockwise direction as indicated by the arrow 100. When the wheel 26 is traveling at a rotational speed slower than the shaft 70, the arm 90 carrying the pawl 93 will rotate about the rack faster than the rotation of wheel 26 and the pawl will accordingly ratchet about the teeth in rack 91. Hence, when making a turn to the right, the clutch mechanism associated with the left wheel will be traveling at a greater speed that the clutch mechanism associated with the right wheel and accordingly the clutch mechanism of the left wheel will cause the rack and pawl to remain engaged and thus drive the shaft 70 at r.p.m. equal to the wheel r.p.m. while the slower wheel on the right will be traveling at r.p.m. less than that of the shaft 70 and accordingly the rack and pawl of the clutch mechanism associated with the right wheel will ratchet and hence be in the non-driving condition.

When it is desired to move the implement from one location to another, the pawl 93 may be manually changed from the position of FIGURE 7 to the position illustrated in FIGURE 8 so that the clutch associated with each drive wheel will be in the disengaged position and accordingly a wheel hub 88 can freely rotate on its spindle at the end of shaft 70. A pawl 93 is associated with each of the hubs 88 as will best be seen in FIGURE 5 with the respective pawls 93 engaging the respective teeth 92 of the rack 91. The pawl and rack arrangement is for right and left hand operations; therefore, if either wheel rolls forward and the pawl is in engaged position, the axle 70 will be turned.

Various modes of carrying out the invention are contemplated as within the scope of the following claims, particularly pointing out and distinctly claiming the subject matter which is recorded as the invention.

I claim:
1. In a grass planting implement; a frame, wheels rotatably secured to and providing support for said frame;
   grass conveying and discharging means mounted on said frame;
   an apertured yoke rigidly attached to and extending away from said frame;
   an upstanding strut rigidly attached to and depending away from said frame and having means forming an apertured platform on the depending free end thereof;
   said aperture in said yoke and said aperture in said platform being spaced a substantial distance apart;
   a shank having an upstanding portion, an apertured depending portion spaced from said upstanding portion by an apertured substantially horizontal portion and a lower bifurcated portion for receiving a digging point;
   a pivot pin received in said aperture substantially horizontal portion and said apertured yoke to provide rotation of said shank from a plowing to a retracted position;
   a spring received between said apertured platform and said apertured depending portion; whereby:
   the tension of said spring normally urges the digging point into extended position so as to normally enter the ground, and enables the digging point to retract upwards and backwards from the ground upon encountering abnormal soil conditions.

2. The device of claim 1, including a U-shaped stop member located at the lower extremity of said yoke to thereby limit the rotation of said digging point in a forward and downwardly rotational direction,
   said yoke cooperating with said bifurcated end of said shank to form a second stop means as said digging point rotates against spring tension into the retracted position.

3. The device of claim 1 wherein said conveyor means includes an outlet end thereon for transporting grass sprigs to the furrow provided by said digging point, and including first drive means operative in response to forward movement of said frame means;
   said discharge means being interposed between said furrow and said outlet means and including second drive means operative in response to forward movement of said frame means;
   said first and second drive means connected to and receiving power from a common shaft;
   said shaft having said wheels rotatably secured thereto;
   selectively engageable clutch means associated with at least the wheels on each end of said shaft whereby:
   upon the wheels of said shaft rotating at different speeds, the fastest rotating wheel drives said shaft in direct proportion to its rotational velocity while the remaining and slower rotating wheel is disengaged from said shaft.

4. The device of claim 3 wherein each said clutch means includes a rack rigidly attached to the wheel hub, an arm rigidly attached to said shaft in close proximity to said rack and including a spring loaded pawl rotatably secured to said arm, whereby:
   said pawl may be rotated into engagement with said rack to thereby drive said axle when said wheel is turned in one direction and whereby said pawl and rack will cooperate in disengaged relationship when said wheel is rotated in an opposite direction.

5. The device of claim 1 wherein the bifurcated shank portion is curved in the area where the shank and digging point mate, so as to present a curved surface that enhances the operation of the plow when it encounters obstacles.

6. The device of claim 5 wherein the spring is attached to said platform by a bolt having a threaded end and means forming an aperture in the opposite end;

said spring being received in the aperture and said threaded end being retained in said platform aperture by a bolt which provides for tension adjusting of said spring.

7. A grass planting implement comprising frame means, wheel means journaled on each end of a shaft means and rotatably supported in said frame means to thereby provide wheeled support for said machine in spaced relation above the ground;

plow means for forming a furrow;

conveyor means including an outlet end thereon for transporting grass sprigs to the furrow provided by said plow means, and including first drive means operative in response to forward movement of said frame means;

separating and discharge means interposed between said furrow and said outlet means and including second drive means operative in response to forward movement of said frame means;

said first and second drive means connected to and receiving power from said shaft;

selectively engageable clutch means associated with at least the wheels on each end of said shaft, whereby:

upon the wheels of said shaft rotating at different speeds, the fastest rotating wheel drives said shaft in direct proportion to its rotational velocity while the remaining and slower rotating wheel is disengaged from said shaft.

8. The device of claim 7 wherein each said clutch means includes a rack rigidly attached to the wheel hub, an arm rigidly attached to said shaft in close proximity to said rack and including a spring loaded pawl rotatably secured to said arm, whereby:

said pawl may be rotated into engagement with said rack to thereby drive said axle when said wheel is turned in one direction and whereby said pawl and rack will cooperate in disengaged relationship when said wheel is rotated in an opposite direction.

9. The device of claim 8 wherein said pawl and spring cooperate to provide over-the-center movement with respect to the pivotal point where the pawl is rotatably secured to said arm;

stop means on said arm to limit rotation of said pawl when rotated in a disengaging direction; whereby:

said pawl is manually rotatable from an engaging position with respect to said rack into a disengaging position with respect to said rack, and vice versa.

References Cited

UNITED STATES PATENTS

| 2,731,899 | 1/1956 | Abrams | 172—710 |
| 2,742,843 | 4/1956 | Redetzke | 172—705 |
| 2,889,959 | 6/1959 | Landgraf | 221—42 |
| 3,026,001 | 3/1962 | Landgraf | 221—42 |
| 3,187,698 | 6/1965 | Murray | 111—2 |
| 3,257,977 | 6/1966 | Overstreet | 111—3 |

ABRAHAM G. STONE, *Primary Examiner.*

ROBERT E. BAGWILL, *Examiner.*